April 24, 1945.　　　R. FREDERICK　　　2,374,596
ROTATABLE TABLE FOR CASING PUNCH PRESSES
Filed July 30, 1942　　　3 Sheets-Sheet 1

INVENTOR.
ROCHELLE FREDERICK
BY
Caesar and Rivise
ATTORNEYS.

April 24, 1945.  R. FREDERICK  2,374,596
ROTATABLE TABLE FOR CASING PUNCH PRESSES
Filed July 30, 1942  3 Sheets-Sheet 2

INVENTOR.
ROCHELLE FREDERICK
BY
Caesar and Rivise
ATTORNEYS.

April 24, 1945.  R. FREDERICK  2,374,596
ROTATABLE TABLE FOR CASING PUNCH PRESSES
Filed July 30, 1942   3 Sheets-Sheet 3

INVENTOR.
ROCHELLE FREDERICK
BY
Caesar and Rivise
ATTORNEYS.

Patented Apr. 24, 1945

2,374,596

UNITED STATES PATENT OFFICE 2,374,596

ROTATABLE TABLE FOR CASING PUNCH PRESSES

Rochelle Frederick, Philadelphia, Pa.

Application July 30, 1942, Serial No. 452,913

7 Claims. (Cl. 205—4)

This invention relates to punch presses especially designed to die shape hollow casings and has as its object the production of a new and improved rotatable table for this type of punch press.

Rotatable tables for punch presses especially designed to die shape hollow casings, such as cartridge shell casings, now in use consist of a casing carrying plate rotatably mounted on a base which has only an outlet aperture formed therein. This aperture is immediately below the punch. The casing carrying plate has formed therein a plurality of equally spaced casing receiving apertures. The casing carrying plate is advanced by a step by step mechanism. Each of the casing receiving apertures periodically comes into registry with the punch and the outlet aperture. At this time the punch descends, performs its operation on the casing positioned in the aperture and forces the casing through the outlet aperture into a receptacle. On many occasions the punch does not function properly and the casing is spoiled. In many other instances a piece of metal chips off from the casing. In either event a portion of the spoiled casing or a piece of the chipped metal is carried forward by the advancing wall of the aperture in the rotatable plate which had contained the spoiled casing or in which the chipping occurred with the result that said pieces of metal get caught between the lower surface of the rotatable plate and its supporting base. In many instances these chips merely retard but do not completely stop the motion of the rotatable plate. When this occurs the cycle of operations of the punch elements is disturbed with the result that the succeeding apertures of the rotatable plate either fail to register or do not properly register with the punch and the outlet aperture. In each such case the punch in its descent will hit the solid metal of the rotatable plate with the result that said punch will either chip or break. It is the object of this invention to produce a rotatable table for punch presses especially designed to punch casings, such as cartridge shell casings, which will be free of this defect. The casings which are processed by successive steps in the punch presses which will be equipped with my novel rotatable table are well known in the art. The disclosure in United States Letters Patent No. 159,883 dated February 16, 1875, is exemplary of said casings and said successive steps. For this reason neither said casings nor said successive steps are described in detail here.

I achieve the foregoing as well as other objects by forming the rotatable table so that an open space will at all times extend from a point beginning at least immediately in front of the approach or front side of the outlet aperture to a point a distance beyond the rear side of said outlet aperture, by forming bridges on the rotatable plate so that they will span said space during the movement of the rotatable plate, and by forming the casing carrying apertures in said bridges.

For the purpose of illustrating my invention with the particularity required by law, I have shown in the drawings which form a part hereof and will now describe two of the many possible structures made in accordance with my novel concepts.

In said drawings

Figure 1:
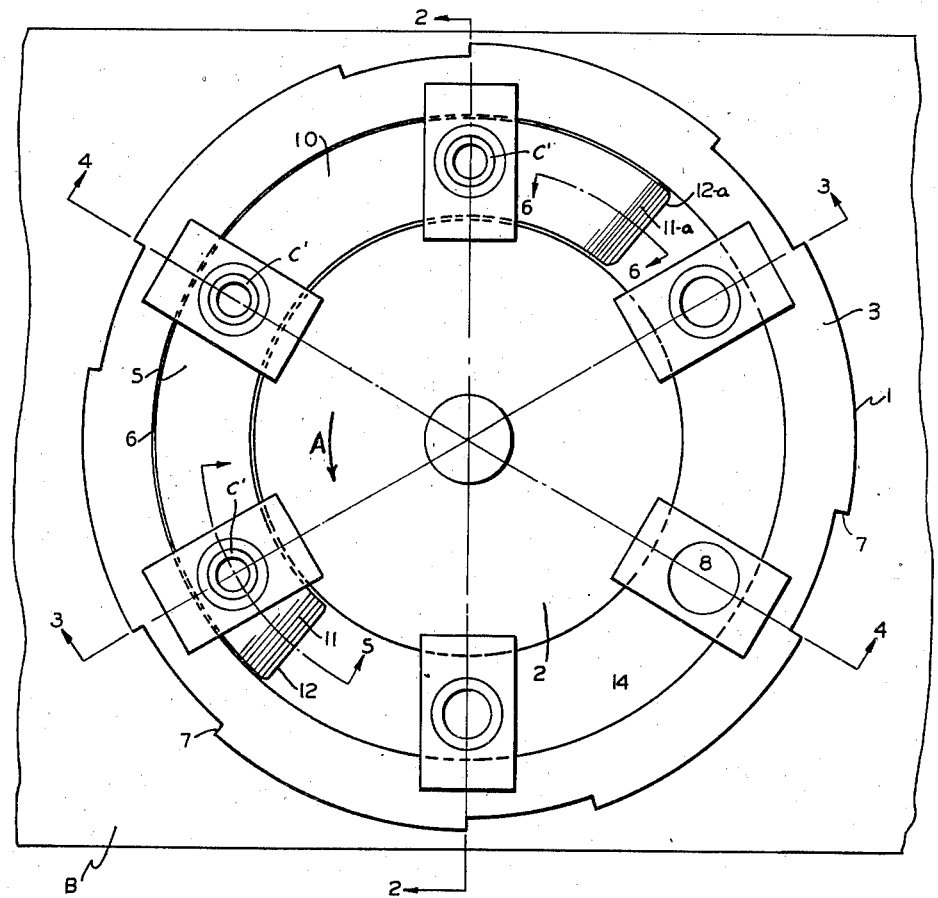
Figure 1 is a plan view of the novel rotatable table. The base has been broken away for the purpose of showing the novel portion on as large a scale as possible.
Figure 2:
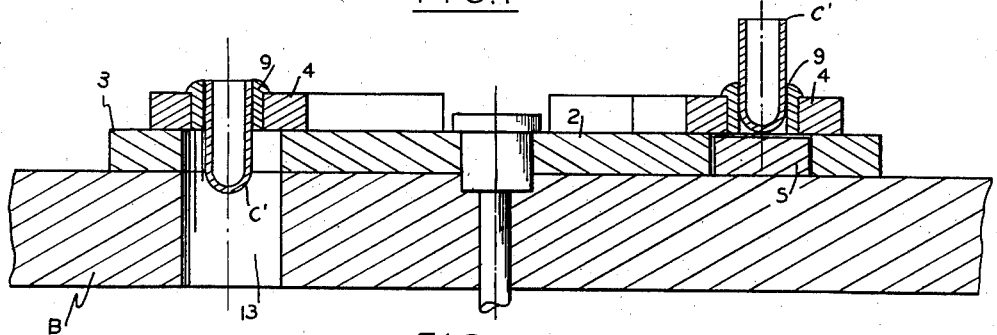
Figure 2 is a section on the line 2—2 of Figure 1.
Figure 3:
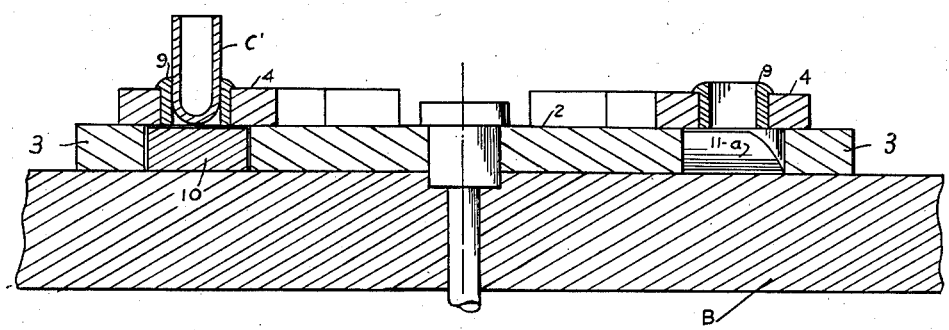
Figure 3 is a section on the line 3—3 of Figure 1.
Figure 4:
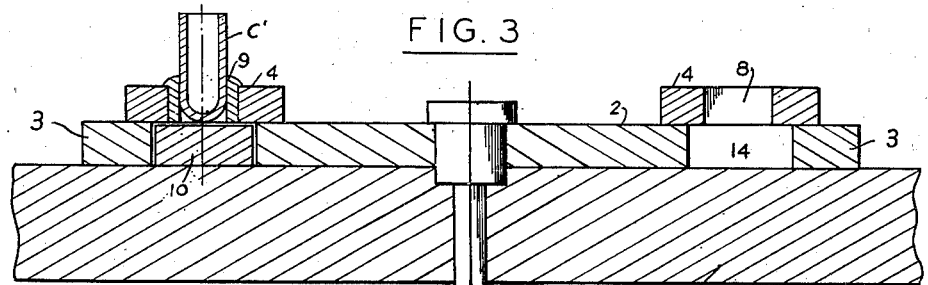
Figure 4 is a section on the line 4—4 of Figure 1.
Figure 5:
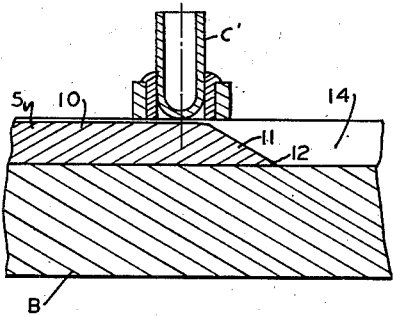
Figure 5 is a section of a fragment on the line 5—5 of Figure 1.
Figure 6:
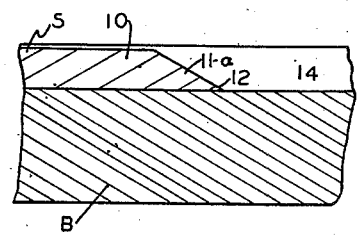
Figure 6 is a section of a fragment on the line 6—6 of Figure 1.
Figure 7:
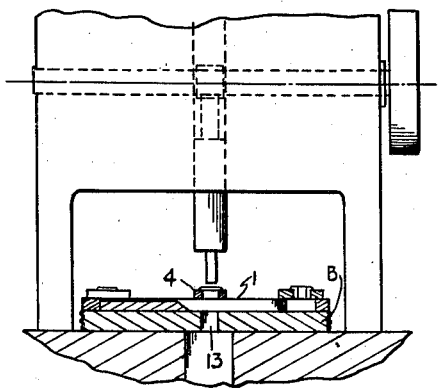
Figure 7 is a front view of a fragment of the punch press head, a fragment of the base and the novel rotatable table in its entirety. The table and base are in section for the purpose of showing otherwise hidden parts.

Referring more particularly to the drawings wherein similar reference numerals and reference letters denote similar parts reference numeral 1 designates the rotatable table shown in Figures 1 to 7 as a unit. The rotatable table 1 is mounted on a base B and is advanced step by step in the manner and by means well known in the art. The base B in and of itself does not form a part of my invention, is well known in the art and for that reason is not shown in detail on the drawings. The means for advancing the table step by step do not form a part of my invention, is well known in the art and for that reason is not shown here.

The rotatable table 1 consists of a central plate 2, an annular ring 3 spaced from said central plate, a plural number of bridging bosses 4 rigidly connecting said central plate 2 with said annular ring 3, and a semicircular filler 5 positioned in the space 6 between said central plate 2 and said annular ring 3.

The annular ring 3 has formed in the periphery thereof a plurality of advancing notches 7 which receive the fingers (not shown) which advance the rotatable table 1 step by step. Both the advancing notches and the fingers are well known in the art.

Each of the bridging bosses 4 has formed therein an aperture 8 which is of a diameter sufficient to receive the largest shell casing C which will be punched in the press. When it is desired to punch shell casings C' of smaller diameters one positions reducing bushings 9 in the aperture 8 in the manner well known in the art.

The semicircular filler 5 consists of a solid body member 10 which terminates in the ramps 11 and 11—a. The semicircular filler 5 is fixedly attached to the base B and is so positioned that the edge 12 of the ramp 11 is in front of the discharge aperture 13 formed in the base B and that the edge 12—a of the ramp 11—a is well beyond said aperture. Because the filler 5 is not a complete circle it does not completely fill the annular space 6 formed between the central portion 2 and the annular ring 3 of the rotatable table 1. This leaves an open space or chamber 14 in the rotatable table 1 which is bridged at intervals by the apertured bridging bosses 4.

This chamber 14 in combination with the apertured bridging bosses 4 are the gist of my invention and distinguish my rotatable table from all others. They provide an open space through which the shell casings C or fragments thereof carried by the apertured bridging bosses 4 may travel in the event that the shell casing C is not punched properly for any reason whatsoever. This in turn reduces punch breakage to the irreducible minimum.

Figure 8:
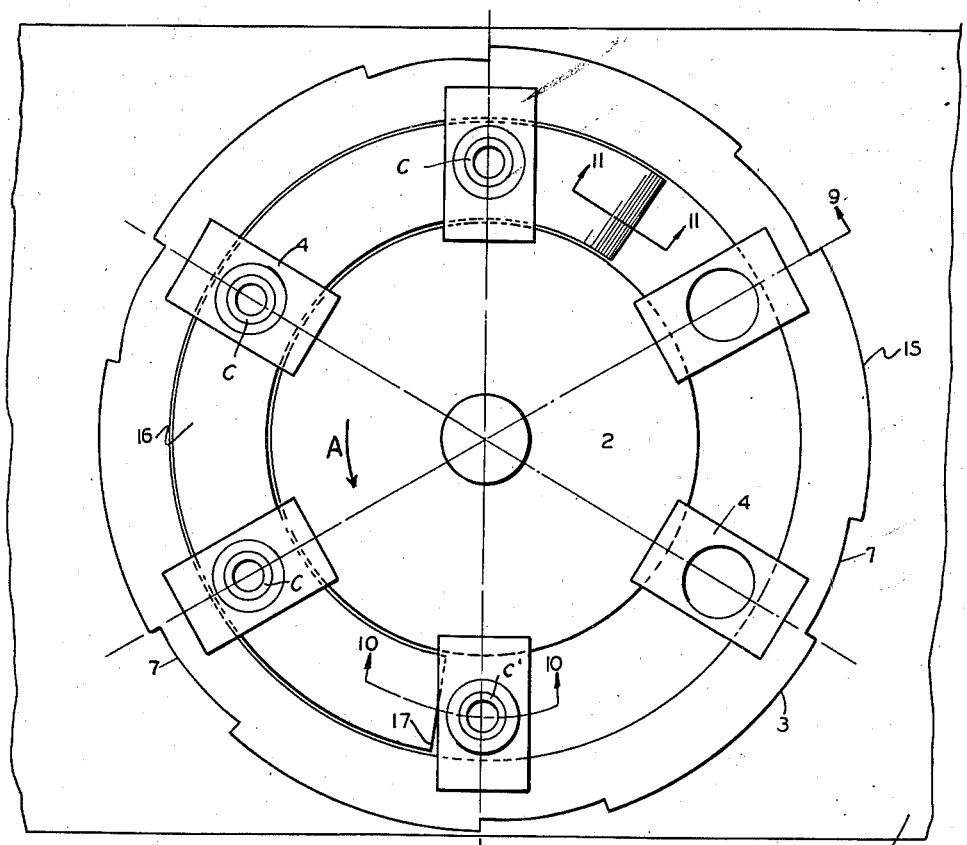
Figure 8 is a plan view of a modification of the rotatable table shown in Figure 1. The base has been broken away for the purpose of showing the novel portion on as large a scale as possible.
Figure 9:
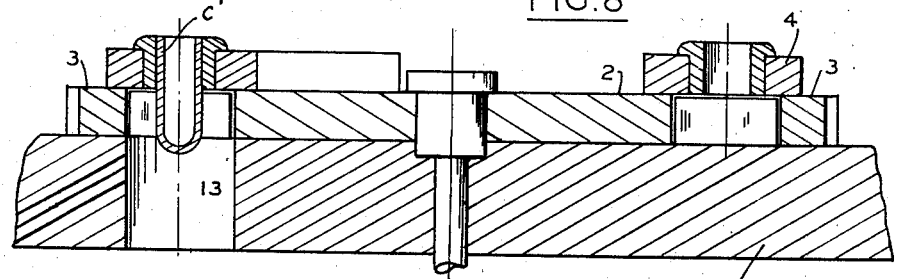
Figure 9 is a section on the line 9—9 of Figure 8.
Figures 10, 11:
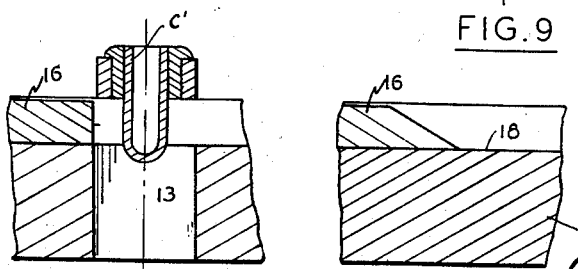
Figure 10 is a section of a fragment on the line 10—10 of Figure 1.
Figure 11 is a section of a fragment on the line 11—11 of Figure 1.

The rotatable table 15 shown in Figures 8 to 11 inclusive differs from that shown in Figures 1 to 7 inclusive only in the fact that its filler 16 terminates in a perpendicular wall 17 at its discharge end. This perpendicular wall is substantially at the front end of the outlet aperture 13. As the table 15 rotates in the direction of the arrow A in this structure, each succeeding casing C will leave the rotatable table 15 when said casing C is immediately above the outlet aperture 13 instead of descending a ramp such as 11 and being pushed along the floor 18 of the chamber 14 as occurs in the structures shown in Figures 1 to 7. As a result the action of the punch on any casing C would cause said casing to clear the outlet aperture 13 of a casing C which may have been stuck therein. For in such circumstances the casing C being acted on by the punch would push out the casing C which had become stuck in the aperture 13.

Having described my invention what I claim as new and useful is:

1. In a punch press designed for die shaping casings and comprising a base member having a discharge opening formed therein and a reciprocating punch positioned in registry with said discharge opening, a casing feeding table rotatably mounted on said base member, said table consisting of a base member having a chamber formed therein; and means having formed therein a casing receiving aperture bridging said chamber.

2. In a punch press designed for die shaping casing and comprising a base member having a discharge opening formed therein and a reciprocating punch positioned in registry with said aperture, a casing feeding table rotatably mounted on said base member, said table consisting of a base member having an annular channel formed therein; and means having formed therein a plurality of equally spaced casing receiving apertures bridging said annular channel.

3. In a punch press designed for die shaping casings and comprising a base member having a discharge opening formed therein and a reciprocating punch positioned in registry with said discharge opening, a casing feeding table rotatably mounted on said base member, said table consisting of a central element; an annular ring spaced from said central element; an annular channel formed between said annular ring and central element; and a plurality of bridges each having formed therein a casing receiving aperture rigidly connecting said annular ring to said central element.

4. In a punch press designed for die shaping casings and comprising a base member having a discharge opening formed therein and a reciprocating punch positioned in registry with said opening, a casing feeding table rotatably mounted on said base member, said table consisting of a central disc whose outer periphery does not overlie said discharge opening; an annular ring whose inner periphery does not overlie said discharge opening spaced from said central disc; an annular channel formed between said annular ring and central element and encompassing said discharge opening; and a plurality of bridges each having formed therein a casing receiving aperture rigidly connecting said annular ring to said central disc.

5. In a punch press designed for die shaping casings and comprising a base member having a discharge opening formed therein and a reciprocating punch positioned in registry with said opening, a casing feeding table rotatably mounted on said base member, said table consisting of a central disc whose outer periphery does not overlie said discharge opening; an annular ring whose inner periphery does not overlie said discharge opening spaced from said central disc; an annular channel formed between said central disc and said annular ring; a plurality of bridges each having formed therein a casing receiving aperture rigidly connecting said annular ring with said central disc; and a filler fixedly attached to said base member and positioned in a portion of said channel where it does not block said discharge opening.

6. In a punch press designed for die shaping casings and comprising a base member having a discharge opening formed therein and a reciprocating punch positioned in registry with said opening, a casing feeding table rotatably mounted on said base member, said table consisting of a central disc whose outer periphery does not overlie said discharge opening; an annular ring whose inner periphery does not overlie said discharge opening spaced from said central disc; an annular channel formed between said central disc and said annular ring; a plurality of bridges each having formed therein a casing receiving aperture rigidly connecting said annular ring with said central disc; and a filler terminating in a ramp at each of its ends fixedly attached to said base member and positioned in a portion of said channel where it does not block said discharge opening.

7. In a punch press designed for die shaping casings and comprising a base member having a discharge opening formed therein and a reciprocating punch positioned in registry with said opening, a casing feeding table rotatably mounted on said base member, said table consisting of a central disc whose outer periphery does not overlie said discharge opening; an annular ring whose inner periphery does not overlie said discharge opening spaced from said central disc; an annular channel formed between said central disc and said annular ring; a plurality of bridges each having formed therein a casing receiving aperture rigidly connecting said annular ring with said central disc; and a filler terminating in a vertical wall at one of its ends and in a ramp at the other of its ends fixedly attached to said base member and positioned in a portion of said channel where it does not block said discharge opening.

ROCHELLE FREDERICK.